United States Patent
Marwali et al.

(10) Patent No.: US 7,459,804 B2
(45) Date of Patent: Dec. 2, 2008

(54) STATIC TRANSFER SWITCH DEVICE AND METHOD

(75) Inventors: Mohammad N Marwali, Lewis Center, OH (US); Terry D Bush, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 444 days.

(21) Appl. No.: 10/904,443

(22) Filed: Nov. 10, 2004

(65) Prior Publication Data

US 2005/0184592 A1 Aug. 25, 2005

Related U.S. Application Data

(60) Provisional application No. 60/521,046, filed on Feb. 10, 2004.

(51) Int. Cl.
*H02J 1/00* (2006.01)
(52) U.S. Cl. .......................................... 307/87; 307/127
(58) Field of Classification Search .................. 307/64, 307/70, 85, 86, 130, 131, 126, 87
See application file for complete search history.

(56) References Cited

U.S. PATENT DOCUMENTS

| | | | |
|---|---|---|---|
| 4,256,972 A | | 3/1981 | Wyatt et al. |
| 4,673,825 A | * | 6/1987 | Raddi et al. .................... 307/66 |
| 5,210,685 A | * | 5/1993 | Rosa .......................... 363/109 |
| 5,502,340 A | | 3/1996 | Schuster et al. |
| 5,784,240 A | | 7/1998 | Przywozny et al. |
| 5,808,378 A | | 9/1998 | O'Leary et al. |
| 5,814,904 A | * | 9/1998 | Galm .......................... 307/130 |
| 6,051,893 A | * | 4/2000 | Yamamoto et al. ............. 307/43 |
| 6,104,106 A | * | 8/2000 | Partridge .................... 307/126 |
| 6,218,744 B1 | * | 4/2001 | Zahrte et al. ................... 307/64 |
| 6,229,228 B1 | * | 5/2001 | Dahler et al. ................... 307/64 |
| 6,327,162 B1 | * | 12/2001 | Larsen et al. ................. 363/51 |
| 6,465,911 B1 | * | 10/2002 | Takeda et al. .................. 307/70 |
| 6,819,012 B1 | * | 11/2004 | Gabrys ........................ 307/68 |

OTHER PUBLICATIONS

Mokhtari, H., et al.: "Performance evaluation of thyristor based static transfer switch", IEEE Transactions on Power Delivery IEEE USA, vol. 15, No. 3, Jul. 2000, pp. 960-966.
PCT International Search Report for International Application No. PCT/US2005/004154 dated May 25, 2005.
PCT Written Opinion of the International Searching Authority for International Application PCT/US2005/004154 dated May 25, 2005.

* cited by examiner

*Primary Examiner*—Michael J Sherry
*Assistant Examiner*—Daniel Cavallari
(74) *Attorney, Agent, or Firm*—Locke Lord Bissell & Liddell LLP (57) ABSTRACT

Devices and methods for improved voltage source transfer switching. First and second voltage sources (primary and alternate) are connectable to a load via corresponding first and second switches, which may comprise SCRs. A controller operates the switches according to various transfer methods. In some transfer methods, the timing of the switching operation is critical. For example, switching times may be optimized to reduce or prevent transformer saturation due to the dc flux built up during the transfer event. The controller force commutates off the primary source switch by turning on the appropriate alternate source switch for a brief period of time. In this case, the alternate source switches are "pulsed" (rather than being turned on continuously), so that the switches will naturally commutate off at the next current zero cross. Subsequently, the volt-second balancing control logic will permanently turn on these switches at the appropriate time.

8 Claims, 6 Drawing Sheets

FIG. 8d

STATIC TRANSFER SWITCH DEVICE AND METHOD

CROSS-REFERENCE TO RELATED APPLICATIONS

This application is a nonprovisional application of U.S. Provisional Application Ser. No. 60/521,046, filed Feb. 10, 2004, which is incorporated by reference. This application is related to U.S. patent application Ser. No. 10/904,443, "Transfer switch device and method," filed on the same day as the present application and incorporated by reference.

BACKGROUND

The present invention relates generally to voltage transfer switches, and more particularly, to AC voltage source transfer methods for switch systems having a transformer downstream of the transfer switch.

Voltage transfer switches are commonly used to switch between a primary and one or more alternate power sources in the event of failure or instability of the primary source. Such transfer switches are commonly used in applications that require continuity of power, such as in hospitals and critical processes in both industrial and commercial settings. For example, in a power system having a primary voltage source and one alternate voltage source, fist and second switches are associated with the primary and alternate voltage sources, respectively. The switches are activated by a controller, such that upon a failure of the primary source, the first switch is opened to remove the primary voltage source from a load and the second switch is subsequently closed to connect the alternate source to the load, hence maintaining power to the load.

The "static switches" used for this switching function typically employ silicon controlled rectifier (SCR) devices. The controller applies signals to the SCRs' gate terminals to gate them into conduction and to commutate them off as necessary based on the condition of the primary and alternate voltage sources. Generally, the second switch is turned on as soon as possible after the load is disconnected from the primary source in an attempt to minimize the voltage disruption at the load side. In some situations, however, the timing of turning off the first switch and turning on the second switch is optimized based on the make-up of the system. For example, in systems having a transformer connected downstream of the switches, switching may be optimized to prevent the transformer from saturating due to the dc flux built up during the transfer event. Such transformer saturations are highly undesirable since they can cause large saturation currents to flow, which in turn can cause system failure due to source overloading or upstream protective breakers tripping.

In such optimized system, the additional delay that results from waiting for the optimum point to transfer may cause increased output voltage waveform disturbance and load current discontinuity, which are not acceptable to some critical loads. Additionally, when SCRs are used in such a voltage transfer switch optimized for minimum downstream transformer saturation currents, there are cases where the SCRs will not naturally commutate off for a significant period of time. This may prevent the controller from turning on the appropriate alternate source SCRs at the optimum time without creating a cross conduction situation, thus extending the transfer time.

The present application addresses these shortcomings associated with the prior art.

SUMMARY

This disclosure is concerned with devices and methods for improved voltage source transfer switching. First and second voltage sources (primary and alternate) are connectable to a load via corresponding first and second switches that are comprised of SCRs. A controller operates the SCRs according to various transfer methods. In some transfer methods, the timing of the switching operation is critical. For example, switching times may be optimized to reduce or prevent transformer saturation due to the dc flux built up during the transfer event. The controller temporarily turns on the appropriate alternate source devices for some controlled brief period of time in order to minimize the output voltage disturbance and/or commutate off the primary devices. The controller force commutates off the primary source SCRs by turning on the appropriate alternate source devices for a brief period of time. In this case, the alternate source SCRs gates drives are "pulsed" (rather than being turned on continuously), so that the SCR's will naturally commutate off at the next current zero cross. Subsequently, the volt-second balancing control logic will permanently turn on these SCRs at the appropriate time. The pulsing action may be repeated as many times as necessary until the required volt-second balanced is achieved, in order to reduce the voltage disturbance and load current discontinuity during the transfer event.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
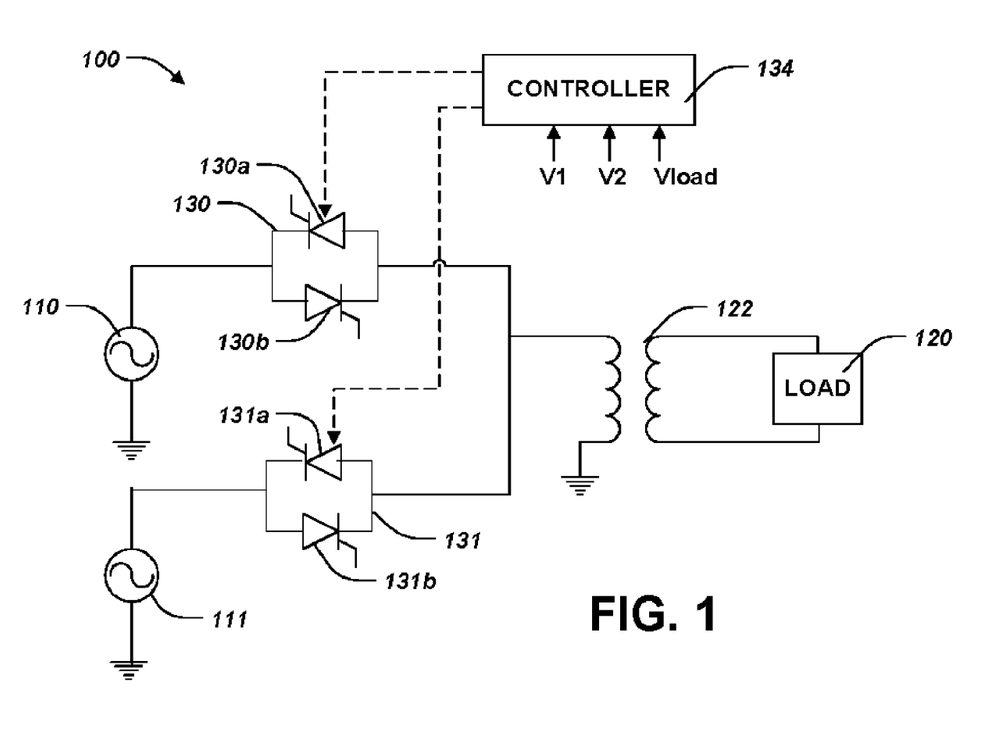
FIG. 1 is a block diagram of an AC voltage transfer system.

FIG. 1 illustrates an AC voltage transfer switch system 100. The transfer switch system 100 includes a first, or primary, voltage source 110 and a second, or alternate voltage source 111. The first and second voltage sources 110, 111 are connected to a load 120 via a transformer 122. First and second switches 130, 131 are connected to the first and second voltage sources 110, 111, respectively, and a controller 134 activates the switches 130, 131. In the illustrated embodiment, the switches 130, 131 comprise first and second silicon controlled rectifiers (SCR) 130a, 130b and 131a, 131b. The controller 134 may comprise, for example, a digital signal processor (DSP) or any suitable programmable logic device. The controller 134 receives the voltage levels of the first and second voltage sources V1 and V2, and the load voltage Vload as inputs. The load voltage Vload here is defined as the output voltage of the transfer switch applied to the transformer primary.

Under normal conditions, the controller biases the first switch 130 to connect the first source 110 (primary source) to the load 120. In the event that the first source 110 fails while the second source 111 (alternate source) is available, the controller 134 detects the condition, and operates the switches 130, 131 to disconnect the first voltage source 110 from the load 120 and subsequently connect the second voltage source, maintaining power to the load 120.

In certain switching schemes, the timing of the switching operation is critical. However, in some configurations, the SCRs will not naturally commutate off for a significant period of time. This may prevent the controller from turning on the appropriate alternate source SCRs at the optimum time.

For example, in known transfer switch systems, the second switch 131 is typically turned on as soon as possible after the load 120 is disconnected from the first voltage source 110 in an attempt to minimize the voltage disruption at the load 120. If the two sources 110, 111 are not initially synchronized, the transformer 122 will saturate due to the DC flux built up during the transfer event. The transformer saturations are highly undesirable since they can cause large saturation currents to flow, which in turn can cause system failure due to source overloading or upstream protective breakers tripping.

To avoid transformer saturation, the optimum time to transfer from the first source 110 to the second source 111 is determined. This optimum time results in additional delay in transfer, which may cause output voltage waveform disturbance that is not acceptable to some critical loads. Additionally, failure of the SCRs to commutate off at the desired time may prevent the controller from turning on the appropriate alternate source SCRs at the optimum time without creating a cross conduction situation, thus extending the transfer time.

Figure 2A:
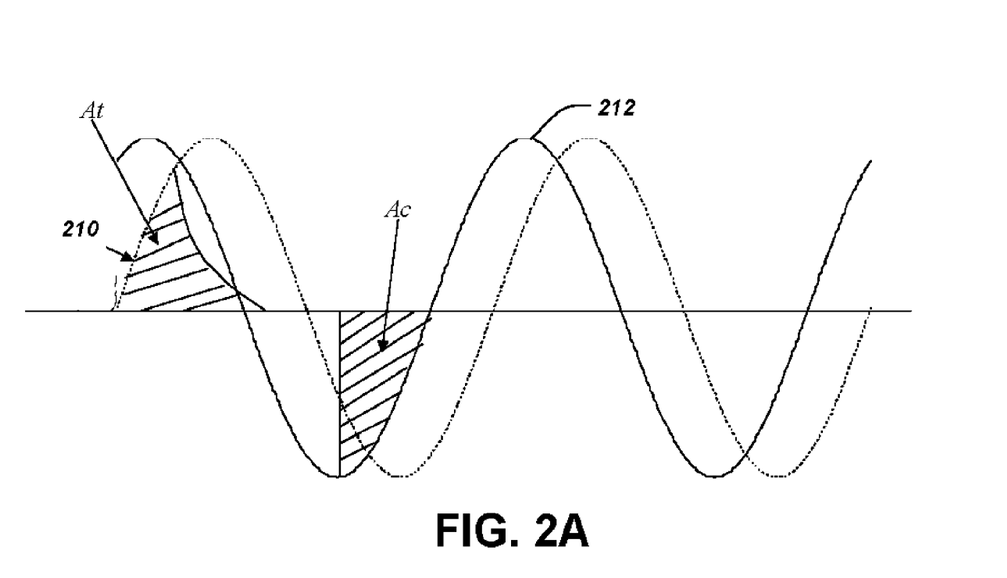
FIGS. 2A and 2B illustrate two sets of voltage waveforms showing balanced voltage conditions.
Figure 2B:
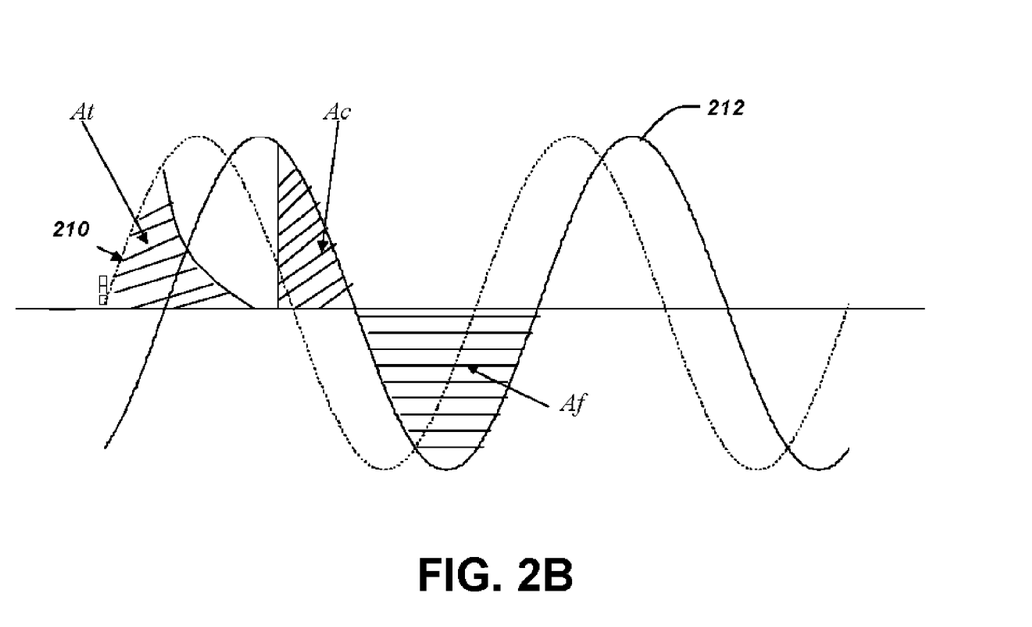

In one embodiment, the transfer time is determined by computing the volt-seconds area of the load and alternate voltages. FIGS. 2A and 2B show waveforms for the load voltage 210 and alternate voltage 212. When the primary source 110 fails, the controller 134 keeps track of the amount of volt-seconds, i.e., the area under the load voltage curve 210 (At) from the time of the last zero-cross until the first switch 130 is turned off, and it computes a compensating area for the alternate source curve 212 (Ac). When a transfer is initiated, the controller 134 waits until the target volt-sec is approximately equal to (as in FIG. 2A) or complements (as in FIG. 2B) the compensating volt-sec area before it turns on the second switch 131. This results in no dc flux built up in the transformer 122 during transfer.

FIGS. 2A and 2B illustrate two different balanced conditions for transferring from the first to the second voltage source. In FIG. 2A, At and Ac have different signs (At·Ac<0). In FIG. 2B, At and Ac have the same sign (At·Ac>0). As noted above, At is the target volt-second area of the load voltage, and Ac is the compensating volt-second area of the alternate voltage. FIG. 2B also includes Af, which represents the full half-cycle volt-second area of the alternate voltage. The quantity Ac involves an event that occurs in the future (after the transfer occurs), and therefore can not be exactly determined. However, assuming that the alternate voltage 212 does not change considerably from the previous cycle before the transfer, the quantity Ac at any given time t can be approximated from $Ac(t) = Af - Ar(t)$, where Af is the previous full half-cycle volt-second area, and Ar is the running integral of the volt-sec area from zero-cross to time t.

Thus, to avoid transfer saturations, in the situation shown in FIG. 2A, the controller 134 operates the switches 110, 111 such that the absolute values of At and Ac are equal (|At|=|Ac|). Defining quantity S1 as S1=At+Ac, the controller 134 turns on the second switch 111 so that S1=0 when (At·Ac<0).

Referring now to FIG. 2B, the controller 134 operates the switches 110, 111 such that the quantities At and Ac added together equal a full half-cycle volt-second area of the alternate voltage (At+Ac=Af). Defining quantity S2 as S2=At+Ac−Af, the controller 134 turns on the second switch 111 so that S2=0 when (At·Ac>0).

Figure 3:
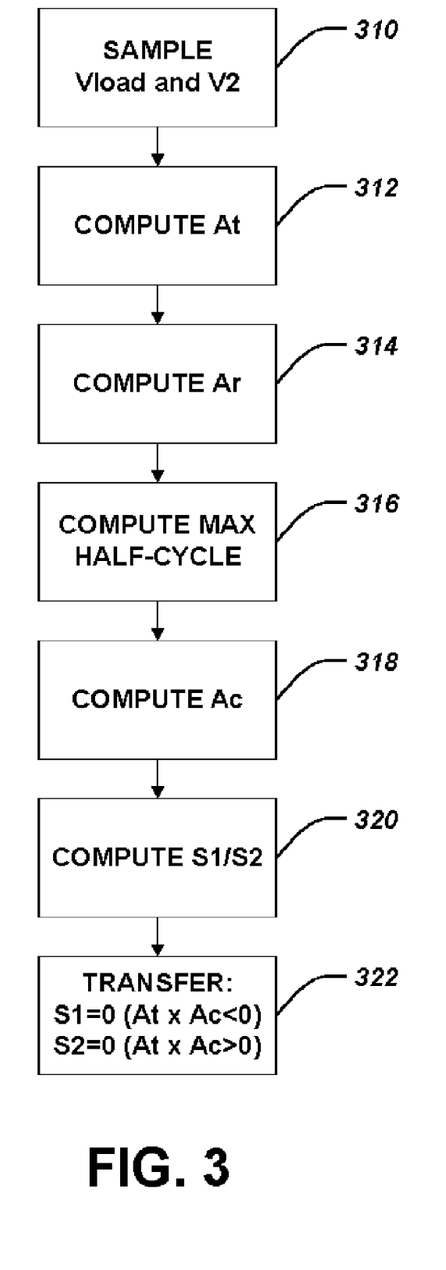
FIG. 3 is a flow diagram of a transfer method disclosed herein.

FIG. 3 is a flow diagram illustrating a specific implementation of the volt-second area method for transferring from the first voltage source 110 to the second voltage source 111. In block 310, the load voltage Vload(k) and the alternate voltage V2(k) are sampled at a predetermined sample rate, for example, 15 kHz. The target volt-sec area At is calculated in block 312 by integrating the load voltage Vload: At(k+1)=At(k)+Vload(k). At each zero-cross of the load voltage Vload, the target volt-second area At(K) is reset, except after a command to transfer occurs. In block 314, the running alternate volt-sec area Ar(k) is calculated by integrating the alternate voltage V2: Ar(k+1)=Ar(k)+V alt(k). The running volt-sec area Ar(k) is also reset to zero at every zero-cross of the alternate voltage V2, except after a command to transfer occurs.

In block 316, the maximum half-cycle volt-second area is calculated by latching the value of Ar(k) at every zero-cross, before resetting Ar(k). The compensating volt-sec area Ac(k) is calculated in block 318 based on the difference between the previous half-cycle volt-second area Af and the the running integral of the volt-sec area Ar. Ac(k)=Af−Ar(k). In block 320, the S1 and S2 are calculated: S1(k)=At(k)+Ac(k) and S2(k)=At(k)+Ac(k)−Af In block 322, the controller 134 performs the transfer when S1(k)=0(At·Ac<0) or when S2(k)=0 (At·Ac>0).

In another embodiment, two flux quantities are computed continuously prior to a transfer event. The first flux corresponds to the flux that is generated by the load voltage Vload when it drives the transformer 122, and the second flux corresponds to an imaginary flux that would be generated by the second voltage source 111, if it were driving the transformer 122. It can be shown that the optimum transfer point is achieved when these two flux quantities are equal.

Figure 4A:
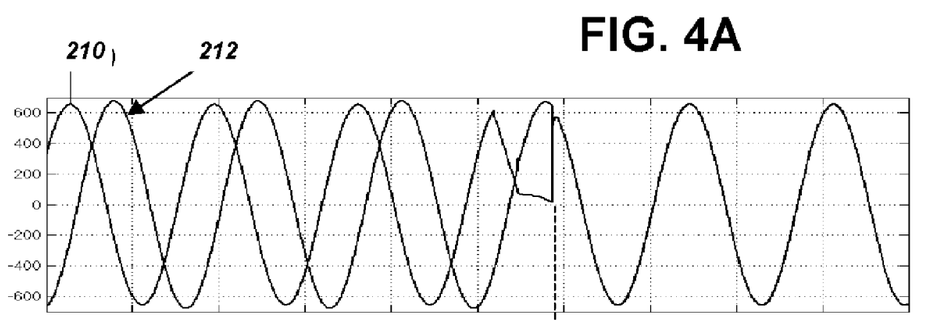
FIGS. 4A and 4B illustrate two voltage waveforms and corresponding flux waveforms.
Figure 4B:
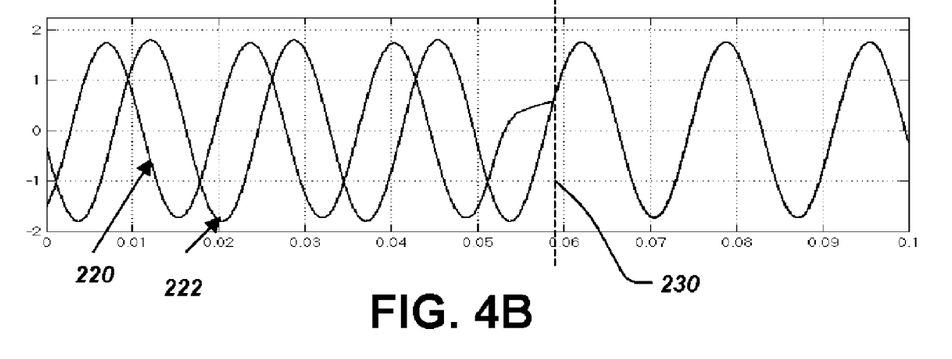

FIG. 4 shows two sets waveforms for the load voltage Vload and alternate voltage V2. The top waveforms are voltage curves for load voltage 210 and alternate voltage 212, and the bottom waveforms are the corresponding flux curves for the load voltage 220 and alternate voltage 222. The controller 134 performs the transfer when the fluxes are equal—shown by the broken line 230.

Ignoring the effect of leakage impedance of the transformer 122, the fluxes built up on the transformer 122 due to the application of the first voltage source 110 and the second voltage source 111 satisfy the following differential equations:

$$\frac{d\phi_1(t)}{dt} \approx V_1(t)$$

$$\frac{d\phi_2}{dt}(t) \approx V_2(t)$$

where $V_1(t)$ and $V_2(t)$ are the first and second source voltages and $\phi_1(t)$, $\phi_2(t)$ are the fluxes corresponding to each voltage.

The fluxes $\phi_1(t)$, $\phi_2(t)$ can be computed by solving the above differential equations at any given time:

$$\phi_1(t) = \int V_1(t)dt$$

$$\phi_2(t) = \int V_2(t)dt$$

In the generalized flux method, the optimum transfer is achieved when the two flux quantities defined above are equal in values: $\phi_1(t)=\phi_2(t)$.

Figure 5:
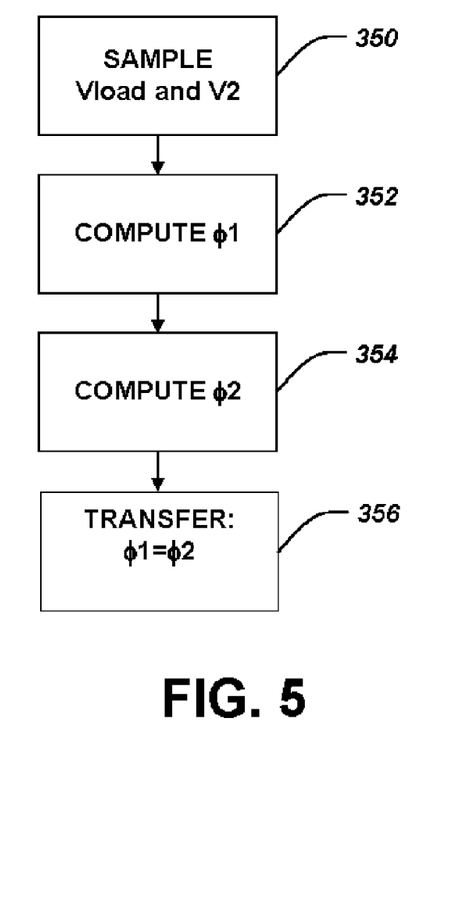
FIG. 5 is a flow diagram of another transfer method disclosed herein.

FIG. 5 is a flow diagram illustrating a specific implementation of the generalized flux method for transferring from the first voltage source 110 to the second voltage source 111. In block 350, the output voltage Vload(k) and the alternate voltage Valt(k) are sampled at a predetermined sample rate, for example 15 kHz. In blocks 352 and 354, the load and alternate fluxes $\phi_1$, $\phi_2$ are determined by integrating the load and alternate voltages, respectively:

$$\phi_{load}(k+1)=\phi_{load}(k)+V_{load}(k); \phi_{alt}(k+1)=\phi_{alt}(k)+V_{alt}(k)$$

The DC component is removed from both flux quantities periodically prior to transfer using any known techniques. In block 356, the transfer is performed when the flux quantities are equal: $\phi_{load}(k)=\phi_{alt}(k)$.

Rather than balancing the volt-second area or fluxes to be exactly equal, as discussed above, some error tolerance can be used in the balanced condition to provide a trade off between reduced transfer time and some amount of transformer saturation current. Denoting the tolerance as zcth, the balanced conditions above can be rewritten as follows:

Volt-second area method where At·Ac<0: |S1|=|At+Ac|≦zcth; and where At·Ac>0: |S2|=|At+Ac−Af|≦zcth.

For the generalized flux method: $|\phi_1-\phi_2|\leq zcth$.

Figure 6A:
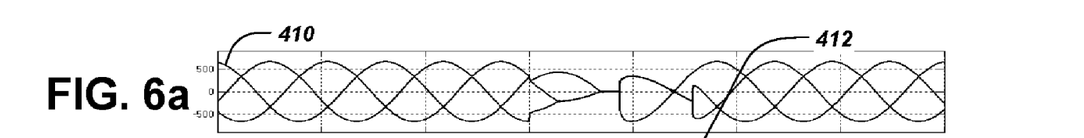
FIGS. 6A-6D illustrate a transfer operation with standard control of the system's SCRs.
Figure 6B:
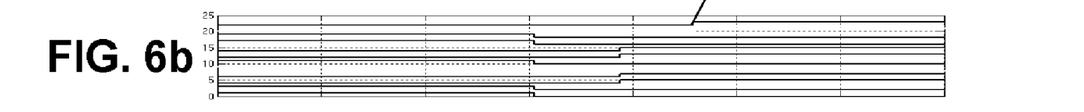
Figure 6C:
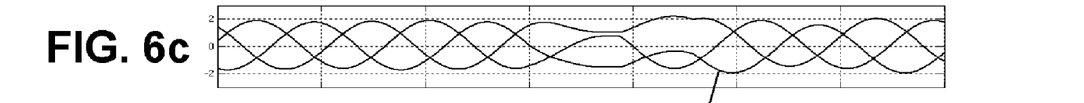
Figure 6D:
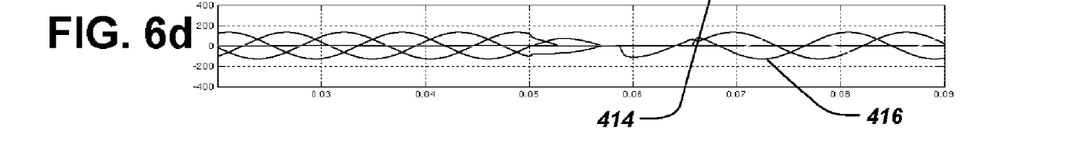

In the embodiment illustrated in FIG. 1, the switches 130, 131 comprise SCRs 130a, 130b and 131a, 131b. There are cases where certain SCRs will not naturally commutate off for a significant period of time, which could result in hampering a precisely timed switching operation. For example, this may prevent the volt-second balancing control from turning on the appropriate alternate source SCRs 131a, 131b at the optimum time without creating a cross conduction situation, thus extending the transfer time. FIGS. 6A-6D illustrate such a situation for a three phase SCR based transfer switch system, illustrating a transfer from the primary source to the alternate source following a 35% voltage droop failure on the primary source, with the alternate source leading the preferred source by 30 degrees. FIG. 6A shows the load voltage waveforms 410 for each of the three phases. FIG. 6B shows the SCR firing signals 412, and FIGS. 6C and 6D show the transformer fluxes 414 and load currents 416, respectively. With standard control of the SCRs, the transfer time for the transfer illustrated in FIGS. 6A-6D is 15.2 milliseconds and the load sees a significant voltage disturbance due to the transfer.

Figure 7A:
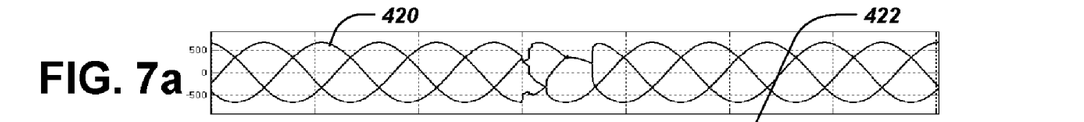
FIGS. 7A-7D illustrate a transfer operation with a pulsing on of the system's SCRs.
Figure 7B:
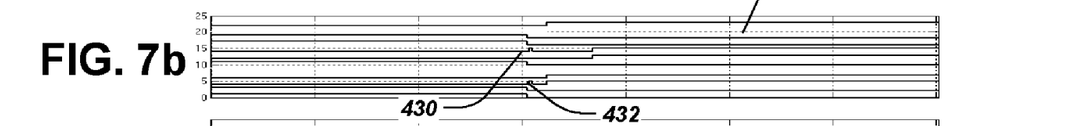
Figure 7C:
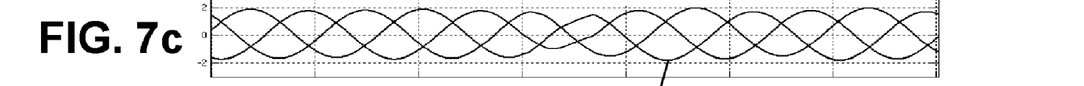
Figure 7D:
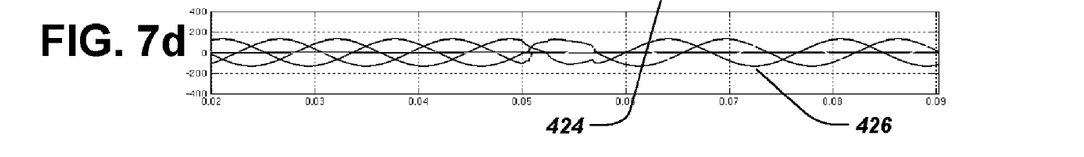

To improve the transfer time and minimize the voltage disturbance seen by the load, the controller operates to force commutate off the preferred SCRs. This is accomplished by turning on the appropriate alternate source devices for a brief period of time. In this case, the alternate source SCRs' gate drives are "pulsed" (rather than being turned on continuously), so that the SCRs will naturally commutate off at the next current zero-cross. Subsequently, the controller will permanently turn on these SCRs at the appropriate time to achieve the desired volt-second balancing. For example, FIGS. 7A-7D show the waveforms for such optimized control of the SCRs. The voltage waveforms 420 are shown in FIG. 7A and the SCR firing signals 422 are shown in FIG. 7B. FIGS. 7C and 7D illustrate the transformer fluxes 424 and load currents 426, respectively. To achieve the desired commutation of the SCRs, the firing signals include pulses 430, 432 shown in FIG. 7B. It can be seen that during transfer the voltage delivered to the load in FIG. 7A is of a higher average value than the voltage delivered to the load in FIG. 6A. Therefore, this technique provides significant reduction in the voltage disturbance seen by the load during transfer.

It should be obvious that the technique described can be employed to minimize voltage disturbance in an optimized volt-second balance system, even for cases where forced commutation of the SCRs is not necessary.

The controller determines if the volt-seconds applied to the transformer (during the pulsing on period) will not adversely affect the desired action of the volt-second balance control. Various methods may be employed to achieve this. For example, for the first embodiment of the volt-second balance system, the following two requirements may be used to provide conditions for pulsing on:

(1) The control just recently missed the opportunity to turn on the SCR at a volt-second balance point (2) The resulting volt-seconds applied does not exceed a value that could cause excessive saturation currents.

Since S1(t) and S2(t) represent the amount of volt-seconds that will be applied when the SCR is fired at time t, these quantities can be used to qualify the above conditions. Assuming that no more than half the rated volt-seconds will be applied to the transformer due to the forced commutation pulse, it can be easily shown that the following conditions satisfy the above two requirements:

For the balanced case where At·Ac<0:

$$OnPulseCondition = \begin{cases} zcth < S1 < \frac{1}{2}Af & \text{if } At > 0 \\ -\frac{1}{2}Af < S1 < -zcth & \text{otherwise} \end{cases}$$

For the balanced case where At·Ac>0:

$$OnPulseCondition = \begin{cases} zcth < S2 < \frac{1}{2}Af & \text{if } At < 0 \\ -\frac{1}{2}Af < S2 < -zcth & \text{otherwise} \end{cases}$$

For the second embodiment of the volt-second balance system, the following may be used to provide the conditions for pulsing on:

(1) The pulsing on should only be applied when the polarity of the alternate voltage is such that the absolute value of the transformer flux ($\phi_{load}$) will be reduced. This condition ensures that the application of the on pulse will not result in the transformer being saturated.

(2) The pulsing on should NOT be applied when the polarity of the alternate voltage is such that the amount of dc flux created—which is given as the difference between the load and alternate flux—is currently being driven toward zero. Pulsing on the alternate switch at this condition will prevent the flux balance condition—which would have occurred shortly if the pulse were not applied—to be delayed and thereby increasing the transfer time.

The first condition is satisfied if the alternate voltage and the load flux fload have different signs. For the second condition, define as the amount of dc flux that would be created, then this quantity is being driven toward zero if the alternate voltage and fd have the same signs. Therefore to satisfy the second condition, the pulsing on should only be allowed if the signs of and fd are different. Combining the two requirements, the on pulse condition for the second embodiment of a volt-second balance system can then be written as OnPulseCondition=($\phi_{load}·V_{alt}$)<0 and ($\phi_d·V_{alt}$)<0

Figure 8A:
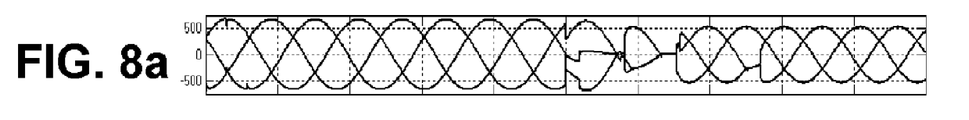
FIGS. 8A-8D illustrate a transfer operation with multiple on pulses of varying width.
Figure 8B:
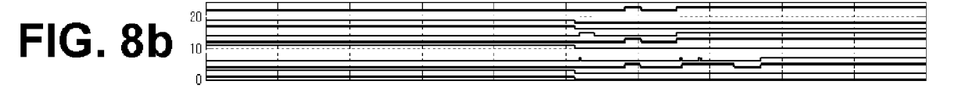
Figure 8C:
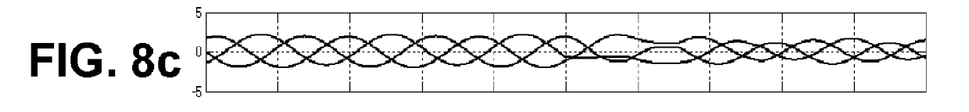
Figure 8D:
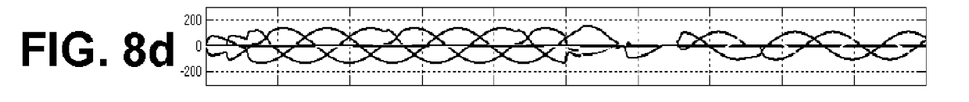

It should be noted here that the on pulse signal that controls the alternate switch can be continuously applied for as long as the above condition remains satisfied. It should also be obvious that the on pulse may be repeated as many time as necessary until the required volt-second balance condition is achieved, and the switch is permanently turned on. This is illustrated in FIG. 8A-D for a three phase SCR based transfer switch system illustrating an extreme case in which a transfer occurs from a primary source which has 120% nominal voltage and 55 Hz frequency to an alternate source with 80% nominal voltage and 63 Hz frequency. The transfer follows a single-phase short-to-neutral fault on the primary source that occurred at a given point in the voltage waveform. FIGS. 8A-D show the waveforms employing the above on pulse conditions. The voltage waveforms 440 are shown in FIG. 8A and the SCR firing signals 442 are shown in FIG. 8B. FIGS. 8C and 8D illustrate the transformer fluxes 444 and load currents 446, respectively. In FIG. 8B, the firing signals include pulses 450 and 452 shown which have varying pulse width defined by the satisfaction of the on pulse conditions above and repeated for more than one time.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A transfer switch system, comprising:
   a first switch connectable to a first voltage source;
   a second switch connectable to a second voltage source; and
   a controller connected to the first and second switches to activate and deactivate the first and second switches to selectively connect the first or the second switch to a load via a transformer;
   the controller having inputs for receiving signals representing the voltage levels of the first and second voltage sources and the voltage applied to the load, wherein upon a predetermined condition, the controller temporarily pulses on the second switch and thereafter, turns on the second switch, wherein the controller determines a switching time to minimize downstream saturation current and turns on the second switch at the switching time.

2. The transfer switch system of claim 1, wherein the controller temporarily pulses the second switch prior to the switching time.

3. The transfer switch system of claim 1, wherein the controller determines the switching time in response to the signals representing the voltage levels of the first and second voltage sources.

4. A transfer switch system, comprising:
   a first voltage source;
   a second voltage source;
   a first switch connected to the first voltage source;
   a second switch connected to the second voltage source;
   a transformer having an input connected to the first and second switches to selectively connect the transformer to the first or second voltage source, the transformer having output terminals connectable to a load; and
   a controller connected to the first and second switches to activate and deactivate the first and second switches to selectively connect the first or the second switch to the transformer;
   the controller receiving signals representing the voltage levels of the first and second voltage sources and the voltage applied to the transformer input, wherein upon a predetermined condition, the controller temporarily pulses on the second switch and thereafter, turns on the second switch, wherein the controller determines a switching time to minimize downstream saturation current and turns on the second switch at the switching time.

5. The transfer switch system of claim 4, wherein the controller temporarily
   pulses the second switch prior to the switching time.

6. The transfer switch system of claim 4, wherein the controller determines the switching time in response to the signals representing the voltage levels of the first and second voltage sources.

7. A transfer switch system, comprising:
   a first silicon controlled rectifier connected to a first voltage source;
   a second silicon controlled rectifier connected to a second voltage source; and
   a controller connected to the first and second silicon controlled rectifiers to activate and deactivate the first and second silicon controlled rectifiers to selectively connect the first or the second silicon controlled rectifiers to a load;

the controller having inputs for receiving signals representing the voltage levels of the first and second voltage sources and the voltage applied to the load, wherein upon a predetermined condition, the controller temporarily pulses on the second silicon controlled rectifier and thereafter, indefinitely turns on the second silicon controlled rectifier to maintain power to the load.

8. A transfer switch system, comprising:
a first silicon controlled rectifier connected to a first voltage source;
a second silicon controlled rectifier connected to a second voltage source; and
a controller connected to the first and second silicon controlled rectifiers to activate and deactivate the first and second silicon controlled rectifiers to selectively connect the first or the second silicon controlled rectifiers to a load via a transformer;
the controller having inputs for receiving signals representing the voltage levels of the first and second voltage sources and the voltage applied to the load, wherein upon a predetermined condition, the controller temporarily pulses on the second silicon controlled rectifier and thereafter, substantially permanently turns on the second silicon controlled rectifier to maintain power to the load.

* * * * *